(12) United States Patent
Gowda (10) Patent No.: US 12,162,498 B2
(45) Date of Patent: Dec. 10, 2024

(54) SYSTEMS AND METHODS FOR TESTING DRIVER AWARENESS WITHIN A VEHICLE AND/OR INTERVENING DURING A POSSIBLE CRISIS

(71) Applicant: Nissan North America, Inc., Franklin, TN (US)

(72) Inventor: Nikhil Gowda, San Francisco, CA (US)

(73) Assignee: Nissan North America, Inc., Franklin, TN (US)

( * ) Notice: Subject to any disclaimer, the term of this patent is extended or adjusted under 35 U.S.C. 154(b) by 516 days.

(21) Appl. No.: 17/459,976

(22) Filed: Aug. 27, 2021

(65) Prior Publication Data

US 2023/0063708 A1 Mar. 2, 2023

(51) Int. Cl.
*B60W 40/08* (2012.01)
*B60W 40/06* (2012.01)
(Continued)

(52) U.S. Cl.
CPC ............ *B60W 40/08* (2013.01); *B60W 40/06* (2013.01); *B60W 50/14* (2013.01); *G06V 20/597* (2022.01); *G06V 40/19* (2022.01); *G08G 1/16* (2013.01); *B60W 2040/0827* (2013.01); *B60W 2420/403* (2013.01); *B60W 2540/229* (2020.02); *B60W 2555/20* (2020.02)

(58) Field of Classification Search
CPC ...... B60W 40/08; B60W 40/06; B60W 50/14; B60W 2040/0827; B60W 2420/42; B60W 2540/229; B60W 2555/20; B60W 2040/0818; G06V 20/597; G06V 40/19; G08G 1/16

See application file for complete search history.

(56) References Cited

U.S. PATENT DOCUMENTS 9,135,803 B1 * 9/2015 Fields ................. G08B 21/02
10,137,902 B2 * 11/2018 Juneja ................. B60W 40/09
(Continued)

FOREIGN PATENT DOCUMENTS

FR        3107495 A1 *  8/2021
JP     2001283238 A  * 10/2001  ......... G06F 3/04817

OTHER PUBLICATIONS

FR-3107495-A1 translation (Year: 2021).*
JP-2001283238-A translation (Year: 2001).*

*Primary Examiner* — Kyle T Johnson
(74) *Attorney, Agent, or Firm* — Global IP Counselors, LLP (57) ABSTRACT

Systems and methods for testing driver awareness within a vehicle are disclosed herein. In an embodiment, the system includes an audio device, a memory, and a controller. The audio device is configured to output audible sentences to a driver of the vehicle and receive audible responses from the driver. The memory stores a plurality of dialog trees, each dialogue tree triggering a plurality of audible sentences. The controller is programmed to (i) cause the audio device to output a first audible sentence to the driver, (ii) receive response data relating to a first audible response provided by the driver to the audio device, (iii) select a dialogue tree of the plurality of dialogue trees based on the response data, and (iv) cause the audio device to output a plurality of second audible sentences from the selected dialogue tree.

20 Claims, 4 Drawing Sheets

(51) Int. Cl.
*B60W 50/14* (2020.01)
*G06V 20/59* (2022.01)
*G06V 40/19* (2022.01)
*G08G 1/16* (2006.01)

(56) References Cited

U.S. PATENT DOCUMENTS

| | | | | |
|---|---|---|---|---|
| 2002/0002460 | A1* | 1/2002 | Pertrushin | H04M 3/533 |
| | | | | 704/E17.002 |
| 2013/0325478 | A1* | 12/2013 | Matsumoto | G08B 21/02 |
| | | | | 704/274 |
| 2016/0101784 | A1* | 4/2016 | Olson | B60K 35/10 |
| | | | | 340/576 |
| 2017/0078224 | A1* | 3/2017 | Chander | G06Q 50/01 |
| 2017/0106876 | A1* | 4/2017 | Gordon | B60W 60/0059 |
| 2017/0372189 | A1* | 12/2017 | Joo | G06N 3/006 |
| 2018/0081892 | A1* | 3/2018 | Barijough | G06Q 50/01 |
| 2019/0377790 | A1* | 12/2019 | Redmond | G06F 40/205 |
| 2020/0130577 | A1* | 4/2020 | Mitra | G08G 1/052 |
| 2020/0310528 | A1* | 10/2020 | Upmanue | A61B 5/4803 |
| 2022/0001878 | A1* | 1/2022 | Sano | B60W 40/09 |
| 2022/0048529 | A1* | 2/2022 | Ding | B60W 60/001 |
| 2024/0054794 | A1* | 2/2024 | Valstar | G06V 10/811 |

* cited by examiner

SYSTEMS AND METHODS FOR TESTING DRIVER AWARENESS WITHIN A VEHICLE AND/OR INTERVENING DURING A POSSIBLE CRISIS

BACKGROUND

Technical Field

The present disclosure generally relates to systems and methods for testing driver awareness within a vehicle and/or intervening during a possible crisis. More specifically, the present disclosure relates to testing driver awareness with audible dialogue and/or intervening during a crisis based on driver responses.

Background Information

With any vehicle operated by a driver, there is a danger that the driver may fall asleep while driving. The driver can also be distracted even if the driver is not in a sleep-deprived state. These types of situations are dangerous not only for the driver, but also for other vehicles on the road.

SUMMARY

It has been discovered that it is advantageous to initiate conversation with the driver of a vehicle to ensure that the driver is alert and awake. The present disclosure provides systems and methods which initiate a structured conversation with the driver, for example, in situations in which the driver appears tired or distracted and/or a driving scenario requires extra attention. The systems and methods are configured to use short dialogue trees to allow for both variation and continuation of dialog to keep the driver engaged, thus preventing or delaying sleep onset. In an embodiment, the short dialog trees can be for a range of topics fitting into personalization modules. For example, based on user preference and tastes, the short dialog trees can be for trivia, short voice-only games, or even planning activities. If these dialog-based tasks are performed when the driver is sleepy, they have the dual impact of keeping driver awake and completing a task or fun activity.

In an example embodiment, the disclosed systems and methods can use context understanding to determine a typical scenario with a high probability of latent sleep effects. For example, the system can begin a conversation by saying "David, how are you doing? Is now a good time for a quick chat?" This then leads into a structured dialog tree that keeps the driver engaged in a shallow conversation lasting a three to six dialog turns while helping to unpack a daily stressor. An AI parser can be trained specifically for this first step and helps in engagement with a thoughtful reply (e.g., driver: "Yeah my boss is driving up a wall", system: "Looks like you had a tough day at work"). Further, this categorization of a stressor (in this example "work" related stress) helps in providing a suitable cognitive behavioral therapy ("CBT") method. Additionally, by focusing on uncovering the stressor using the CBT method, the systems and methods are offering a solution that helps with engagement, a critical requirement to elevate cognitive function and thereby delay the onset of sleep.

In another example embodiment, the system receives a sleepiness indicator, for example from an eye tracking system or on-board camera, based on which the system triggers the start of the conversation.

In another example embodiment, the system uses a sleepiness index questionnaire to determine how sleepy the driver is before starting the CBT method. The former is the measure that determines latent sleep effects and the latter is the short dialog that aims to elevate cognitive function and prevent/delay sleep. In this embodiment, the sleepiness index questionnaire itself acts as a dialog, further improving the efficacy of engaging the driver's cognitive function.

In view of the state of the known technology, one aspect of the present disclosure is to provide a system for testing driver awareness within a vehicle. The system includes an audio device, a memory, and a controller. The audio device is configured to output audible sentences to a driver of the vehicle and receive audible responses from the driver. The memory stores a plurality of dialog trees, each dialogue tree triggering a plurality of audible sentences. The controller is programmed to (i) cause the audio device to output a first audible sentence to the driver, (ii) receive response data relating to a first audible response provided by the driver to the audio device, (iii) select a dialogue tree of the plurality of dialogue trees based on the response data, and (iv) cause the audio device to output a plurality of second audible sentences from the selected dialogue tree.

A second aspect of the present disclosure is to provide another system for testing driver awareness within a vehicle. The system includes at least one sensor, an audio device, and a controller. The at least one sensor is configured to generate driver data relating to a current state of a driver of the vehicle. The audio device is configured to output audible sentences to the driver and receive audible responses from the driver. The controller is programmed to trigger the audio device to output a plurality of audible sentences to the driver upon determining from the driver data that the current state is a triggering driver state.

A third aspect of the present disclosure is to provide a method for testing driver awareness within a vehicle. The method includes triggering an audio device to output a first audible sentence to a driver of the vehicle based upon a determination of at least one of a triggering driver state, a triggering weather state, a triggering traffic state, a triggering road state, or a triggering vehicle component state, receiving response data relating to a first audible response provided by the driver to the audio device, selecting a dialogue tree from a plurality of dialogue trees based on the response data, and causing the audio device to output a plurality of second audible sentences from the selected dialogue tree.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
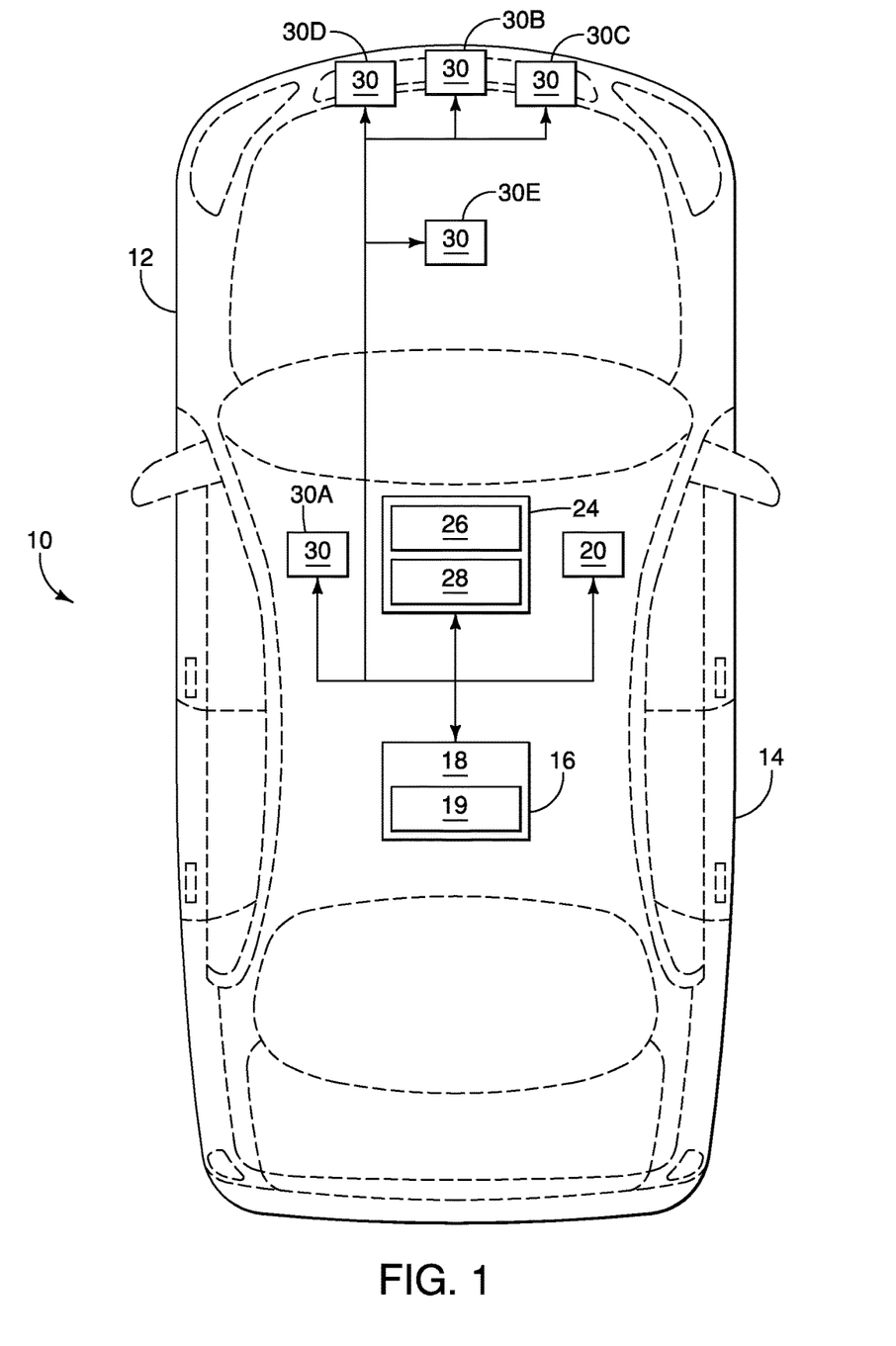
FIG. 1 illustrates a schematic diagram of an example embodiment of a system for testing driver awareness within a vehicle in accordance with the present disclosure.

Referring initially to FIG. 1, a system 10 for testing driver awareness within a vehicle 12 is illustrated in accordance with a first embodiment. In the illustrated embodiment, the system 10 includes a vehicle 12 having a vehicle body 14 and a controller 16. Alternatively, the system 10 can include the controller 16 and/or other components discussed herein and be separate from and in communication with one or more components of the vehicle 12.

In an embodiment, the controller 16 includes at least one processor 18 and at least one memory 19. The controller 16 preferably includes a microcomputer with a vehicle component control program that controls one or more adjustable vehicle components 20 and/or an audio device 24 as discussed below. The controller 16 can also include other conventional components such as an input interface circuit, an output interface circuit, and storage devices such as a ROM (Read Only Memory) device and a RAM (Random Access Memory) device. The microcomputer of the controller 16 is programmed to control one or more vehicle component 20, audio device 24 and/or sensor 30 discussed herein. The memory circuit stores processing results and control programs such as ones for vehicle component control operations that are run by the processor circuit. The controller 16 is operatively coupled to the vehicle body 14 in a conventional manner. The internal RAM of the controller 16 stores statuses of operational flags and various control data. The internal ROM of the controller 16 stores the instructions for various operations. The controller 16 is capable of selectively controlling any of the components of the vehicle 12 in accordance with the control program.

The vehicle 12 includes at least one vehicle component 20. More specifically, the vehicle 12 includes a plurality of vehicle components 20. A vehicle component 20 can include any vehicle component that is capable of being controlled based on instructions from the controller 16. Typically, as explained in more detail below, the controller 16 will adjust a vehicle component in accordance with the present disclosure in response to a crisis situation. In one example, the vehicle component 20 includes the engine of the vehicle 12, and the controller 16 is configured to adjust the engine by shutting off the engine. In another example, the vehicle component 20 includes an emergency contact system within the vehicle, and the controller 16 is configured to adjust the emergency contact system by causing the emergency contact system to contact an emergency service. In another example, the vehicle component 20 includes an in-vehicle alarm, and the controller 16 is configured to adjust the alarm by setting off the alarm. In another embodiment, the vehicle component 20 includes a driver assistance system, and the controller 16 is configured to adjust the driver assistance system by triggering the driver assistance system to safely pull the vehicle 12 off to the side of the road or to another safe location. Those of ordinary skill in the art will recognize from this disclosure that various other vehicle components 20 can be controlled in accordance with the systems and methods discussed herein. An adjustment of a vehicle component 20 can include any adjustment triggered by the controller 16 (e.g., physical, electrical, and/or computer adjustment, etc.).

In an embodiment, the vehicle 12 includes an audio device 24. The audio device 24 is configured to output audible sentences to a driver of the vehicle 12 and receive audible responses from the driver. The audio device 24 can also serve other functions within the vehicle 12, for example, can also be used by a navigation system, an in-vehicle entertainment unit, or another vehicle component. In an embodiment, the vehicle 12 includes multiple audio devices 24. The audio device 24 can also be a vehicle component 20 which is controlled by the controller 16 in accordance with the present disclosure (e.g., to provide an alarm or other alert to the driver).

The audio device 24 includes a microphone 26. The microphone 26 is configured to receive audible responses from the driver of the vehicle 12. The audio device 24 also includes a speaker 28 configured to output audible sentences to the driver. In an embodiment, the microphone 26 and the speaker 28 are located together on the same unit. Alternatively, the microphone 26 and speaker 28 can be located separately. In an embodiment, the audio device 24 can include multiple microphones 26 and/or multiple speakers 28 located at different locations within the vehicle 12.

The audio device 24 is configured to generate response data based on an audible response. In an embodiment, the response data represents the audible response received by the audio device 24 from the driver. In an embodiment, each audible response received by the audio device 24 results in the generation of distinct response data. In an embodiment, the response data includes an automatic speech recognition (ASR) output and/or a natural language understanding (NLU) output and/or is used to generate an ASR output and/or an NLU output. In an embodiment, the audio device 24 and/or controller 16 is configured to process the response data using speech recognition software. Use of the response data by the controller 16 is discussed in more detail below.

In the illustrated embodiment, the vehicle 12 includes at least one sensor 30. More specifically, the vehicle 12 includes a plurality of sensors 30. Each sensor 30 is configured to generate context data. In an embodiment, the context data includes at least one of (i) driver data relating to a current state of the driver of the vehicle, (ii) traffic data relating to a current state of traffic, (iii) weather data relating to a current state of weather, (iv) road data relating to a current state of one or more road, and/or (v) vehicle component data relating to a current state of one or more vehicle component 20. Those of ordinary skill in the art will recognize from this disclosure that there are also other types of context data capable of detection by a sensor 30. A sensor 30 can be located inside or outside of the vehicle 12. As should be understood by those of ordinary skill in the art from this disclosure, the location and/or type of sensor 30 will typically depend on the type of context data being gathered.

In an embodiment, the at least one sensor 30 includes a driver sensor 30A. The driver sensor 30A is directed at the driver of the vehicle 12. The driver sensor 30A is configured to generate driver data relating to a current state of the driver. In an embodiment, the driver sensor 30A includes, for example, a sensor which detects the driver's line of sight, head position, eye position, facial expression, body language, or other driver data that is specific to the driver. In an embodiment, a driver sensor 30A includes one or more image sensor configured to record one or more image of the driver of the vehicle 12 and generate the driver data from the at least one image. In an embodiment, an image sensor includes a camera configured to record one or more image of the driver. The image can include still images or video. In an embodiment, an image sensor is located at or near the dashboard of the vehicle 12 and is focused rearward toward the driver to capture the front side of the driver's head. The image sensor can also be located at other locations and/or capture the driver from other angles. In an embodiment, the controller 16 is configured to use driver data from such an image sensor to generate context data related to the driver's line of sight, head position, eye position, facial expression, or body language. In an embodiment, the controller 16 is configured to determine the driver's line of sight, head position, eye position, facial expression, body language, etc. using one or more image recognition algorithm (e.g., using size and/or shape recognition, one or more neural network, etc.).

In an embodiment, the at least one sensor 30 includes a traffic sensor 30B. The traffic sensor 30B is configured to generate traffic data relating to a current state of traffic. In an embodiment, the traffic sensor 30B includes a proximity sensor or image sensor which detects other cars in a vicinity of the vehicle 12 and/or which detects traffic signals. In an embodiment, an image sensor includes a camera configured to record one or more image outside of the vehicle 12, and the controller 16 is programmed to determine a traffic situation using the image, for example, using size and/or shape recognition to determine the presence of other vehicles, traffic signs and signals, or other traffic-related objects. In the illustrated embodiment, the traffic sensor 30B is positioned at the front of the vehicle 12 to detect traffic in front of the vehicle 12. Those of ordinary skill in the art will recognize from this disclosure that there are various types of sensors 30 which detect traffic-related information.

In an embodiment, the at least one sensor 30 includes a weather sensor 30C. The weather sensor 30C is configured to generate weather data relating to a current state of weather. In an embodiment, the weather sensor 30C includes a moisture sensor which detects moisture outside of the vehicle 12 (e.g., which detects rain or snow). In an embodiment, the weather sensor 30C includes a temperature sensor which detects the temperature inside and/or outside of the vehicle 12. In an embodiment, the weather sensor 30C includes a noise sensor which detects the wind or other weather-related noise outside of or coming into the vehicle 12. Those of ordinary skill in the art will recognize from this disclosure that there are various types of sensors 30 which detect weather-related information.

In an embodiment, the at least one sensor 30 includes a road sensor 30D. The road sensor 30D is configured to generate road data relating to a current state of one or more road surface. In an embodiment, the road sensor 30D detects a roughness of the road surface. In an embodiment, the road sensor 30D detects a type of road surface (e.g., sand, gravel, mud, asphalt, concrete, etc.). In an embodiment, the road sensor 30D detects a road condition (e.g., a slick surface due to rain, snow, etc.). Those of ordinary skill in the art will recognize from this disclosure that there are various types of sensors 30 which detect road-related information.

In an embodiment, the at least one sensor 30 includes a vehicle component sensor 30E. The vehicle component sensor 30E is configured to generate vehicle component data relating to a current configuration/state of a vehicle component 20. In an embodiment, the vehicle component sensor 30E includes, for example, a sensor which detects a current state such as an ON/OFF state, a mechanical/positional configuration, a volume level, a temperature, a route, or any other detectable state of a vehicle component 20. In an embodiment, a vehicle component sensor 30E is configured to detect that the current state of a vehicle component 20 is one of a plurality of different configurations. Those of ordinary skill in the art will recognize from this disclosure that there are various types of sensors 30 which detect component-related information.

Figure 2:
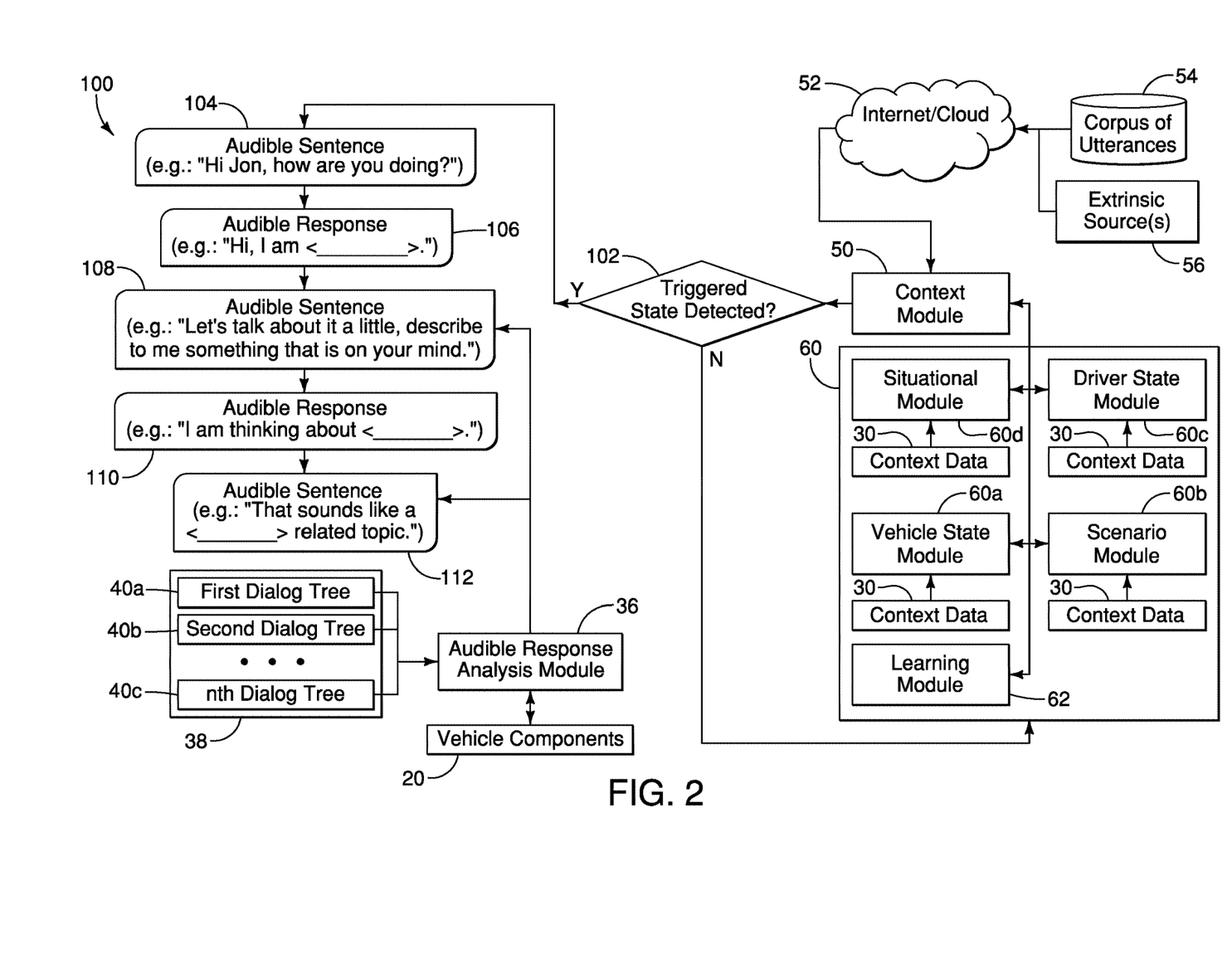
FIG. 2 illustrates an example embodiment of a method for testing driver awareness within a vehicle which can be implemented using the system of FIG. 1.

FIG. 2 illustrates an example embodiment of a method 100 for testing driver awareness within a vehicle 12. Some or all of the steps of the method 100 can be stored as instructions on at least one memory 19 of the controller 16 and executed by at least one processor 18 of the controller 16. Some or all of the steps of the method 100 can also be stored as instructions on a memory of one or more of a vehicle component 20, audio device 24 and/or sensor 30 and executed by a processor of the vehicle component 20, audio device 24 and/or sensor 30. It should be understood from this disclosure that some of the steps described herein can be reordered or omitted without departing from the spirit or scope of the method 100.

As illustrated in FIG. 2, the controller 16 includes an audible response analysis module 36. The audible response analysis module 36 is programmed to interpret audible responses from the driver of the vehicle 12. The audible response analysis module 36 is programmed to interpret audible responses, for example, by generating and/or processing an automatic speech recognition (ASR) output and/or a natural language understanding (NLU) output to determine what the driver has spoken into the audio device 24. The audible response analysis module 36 is further programmed to generate appropriate audible sentences to output to the driver 24 in response to the audible responses, for example, by selecting appropriate dialogue trees as discussed herein. In an embodiment, the audible response analysis module 36 includes speech recognition software and/or speech generation software.

Figure 3:
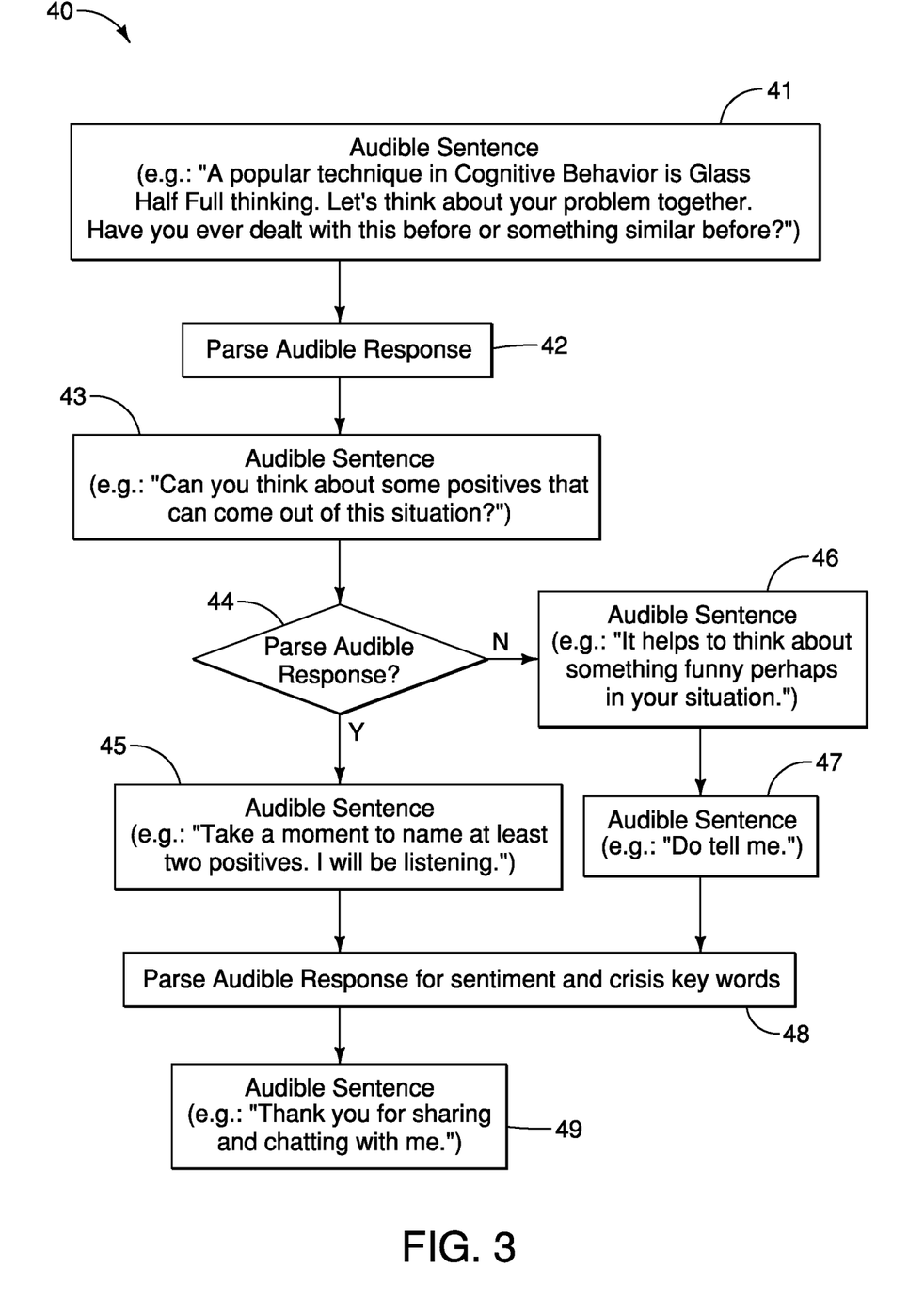
FIG. 3 illustrates an example embodiment of a dialogue tree which can be used in the example method of FIG. 2.

As illustrated in FIG. 2, the memory 18 includes a database 38 which stores a plurality of dialog trees 40. Each dialogue tree 40 triggers a plurality of audible sentences. As explained in more detail below, the controller 16, via the audible response analysis module 36, is programmed to select a dialogue tree 40a, 40b . . . 40n of the plurality of dialogue trees 40 based on the response data from one or more audible response spoken by the driver of the vehicle 12 into the audio device 24. FIG. 3, discussed in more detail below, illustrates an example embodiment of a dialogue tree 40.

In an embodiment, each of the plurality of dialogue trees 40 are weighted. The weightings allow the controller 16, via the audible response analysis module 36, to select an appropriate dialogue tree 40a, 40b . . . 40n during the method 100. In an embodiment, each of the plurality of dialogue trees 40 are weighted based on the driver's preferences. For example, the driver may prefer dialogue trees 40 related to trivia, short voice-only games, planning activities, or other particular subjects. In another example, each of the plurality of dialogue trees 40 are weighted based how the driver has previously responded to one or more dialogue tree 40. In an embodiment, each of the plurality of dialogue trees 40 are weighted based on one or more key word spoken by the driver in an audible response. In an embodiment, the controller 16 continuously adjusts one or more weights based on the reaction of the driver in response to outputting sentences from the dialogue trees 40. This way, the controller 16 is programmed to access dialogue trees 40 which are most interesting to the driver, thus keeping the driver's attention and preventing the onset of sleep.

As illustrated in FIG. 2, the controller 16 includes a context module 50. The controller 16, via the context module 50, is programmed to process context data and determine the existence of a triggering state. The processing of the context data to determine a triggering state is discussed in more detail below.

In the illustrated embodiment, the controller 16 is configured to access context data from one or more remote source. Specifically, the controller 16 is configured to access context data from a remote source via a wireless network 52. Here, the remote source includes a corpus of utterances 54 and/or one or more extrinsic source 56. In an embodiment, the corpus of utterances 54 includes a database of phrases which are alternatives to possible audible responses received by the audio device 24. In an embodiment, the one or more extrinsic source 56 includes, for example, a weather database with weather data related to the weather in the area of the vehicle 12 as discussed herein, a traffic database with traffic data related to traffic in the area of the vehicle 12 as discussed herein, and/or a road condition database with road data related to road conditions in the area of the vehicle 12 as discussed herein.

In the illustrated embodiment, the controller 16 is configured to access context data from one or more state module 60 stored locally in at least one memory 19. The state modules 60 process context data from one or more sensor 30. In an embodiment, a state module 60 includes one or more of a vehicle state module 60a, a scenario module 60b, a driver state module 60c, a situational module 60d, and/or another module which processes context data. In an embodiment, each state module 60 includes processing instructions for receiving and processing context data from one or more respective sensor 30. In an embodiment, one or more module 60 can be accessed wirelessly via the network 52 instead of via a local memory 19.

The vehicle state module 60a is configured to process context data related to a current state of one or more vehicle components 20. In an embodiment, the vehicle state module 60a is configured to process vehicle component data relating to a current state of at least one vehicle component 20. For example, in various embodiments, the vehicle state module 60a is configured to process context data from a vehicle component sensor 30E to determine whether one or more vehicle component 20 is on or off. In various embodiments, the vehicle state module 60a is configured to process context data from a vehicle component sensor 30E to determine a mechanical configuration, electrical configuration, computer configuration or mode, or any other detectable state of a vehicle component 20. In an embodiment, the vehicle state module 60a is configured to process context data from a vehicle component sensor 30E to detect that the current state of a vehicle component 20 is one of a plurality of different configurations. Thus, in an embodiment, the vehicle state module 60a is configured to detect abnormal situations based on the current state of one or more vehicle component 20.

The scenario module 60b is configured to process context data related to a current scenario of the vehicle 12. The scenario can be, for example, a weather-related scenario (e.g., that the vehicle 12 is experiencing rain, high winds, humid weather, etc.). In an embodiment, the scenario module 60b is configured to process weather data relating to a current state of weather as determined by a weather sensor 30C as discussed herein. In an embodiment, the scenario module 60b is configured to process context data related to a non-weather related scenario. For example, in an embodiment, the scenario module 60b is configured to process road data relating to a current state of one or more road as determined by a road sensor 30D as discussed herein. In another example embodiment, the scenario module 60b is configured to process traffic data relating to a current state of traffic as determined by a traffic sensor 30B as discussed herein.

The driver state module 60c is configured to process context data related to the driver of the vehicle 12. In an embodiment, the driver state module 60c is configured to process driver data relating to the driver of the vehicle 12 as discussed herein. The driver data can include, for example, the driver's line of sight, head position, eye position, facial expression, body language, whether the occupant is yawning or covering his or her mouth, or other driver data.

In an embodiment, the context data related to the driver of the vehicle 12 includes data from an image taken of the driver by an image sensor 30A. From the image, the driver state module 60c is configured to detect conditions such as the driver's line of sight and/or head position based on eye and/or head direction. The driver state module 60c is configured to detect conditions such as whether the driver is yawning using image recognition processing. The driver state module 60c is also configured to detect conditions such as facial expressions using image recognition processing. The image recognition processing can be performed, for example, via one or more neural network.

In an embodiment, the driver data indicates whether the driver appears to be falling asleep. The controller 16 is configured to determine whether the driver is tired based on the driver data (e.g., yawning, closing eyes, etc.). For example, the driver yawning can be determined, for example, by an image taken by the driver sensor 30A which shows the driver's mouth to be opened by a predetermined amount and/or for a predetermined amount of time. In another example, the driver being tired or falling asleep can be indicated based on the driver's eyes closing by a predetermined amount and/or for a predetermined period of time.

In an embodiment, the driver data indicates the current line of sight detected for a driver of the vehicle 12. The controller 16 is configured to determine the driver's line of sight using the driver data. More specifically, the controller 16 is configured to use the driver data to determine the driver's head pose and gaze direction. The driver's head pose includes the direction that the driver's head is turned. The driver's gaze direction includes the direction that the driver's eyes are pointing, for example, in relation to the driver's face. Based on the driver's head pose and/or gaze direction, the controller 16 is configured to calculate a probable line of sight for the driver. The driver's line of sight being focused away from the road (e.g., in a nonforward direction) can indicate that the driver is not paying attention to the road. Alternatively or additionally, the controller 16 is configured to determine the driver's attention level based on the sight data. The attention level can be based, for example, on how often or quickly the driver is moving his or her head or eyes.

The situational module 60d is configured to process context data related to a current situation relating to traffic or other obstacles surrounding the vehicle 12. In an embodiment, the situational module 60d is configured to process traffic data relating to a current state of traffic as discussed herein. In an embodiment, the context data processed by the situational module 60d includes one or more of a vehicle classifier, a vehicle direction, the traffic density, road features, weather, and/or other data. In an embodiment, the situational module 60d is configured to process context data to determine one or more of an impact of the vehicle class, an impact of the vehicle direction, an impact of traffic density, an impact of turning or otherwise changing direction, or another impact. In various embodiments, the situational module 60d is configured to process one or more of vehicle component data, weather data, traffic data and/or road data as discussed herein.

In an embodiment, the situational module 60d includes a MODIA (multiple online decision-components with interacting actions) model. Such a model can be configured to provide intelligent driving assist technology that aids the driver of a vehicle with navigation in real-time, for example, using various sensors in combination with a navigation system such as a global positioning system.

In an embodiment, the controller 16 includes a learning module 62. The learning module 62 is configured to learn from the context module 50 processing audible responses that are received from the driver. In an embodiment, if the driver reacts negatively to a triggering state detected by the context module 50, the learning module 62 is configured to adjust the triggering state so that it occurs less frequently or not at all. For example, if the context module 50 detects a triggering state based on the driver appearing tired, but the driver responds negatively that he or she is not tired, then the learning module 62 is configured to adjust the triggering states so that the particular parameters which determined the triggering state are devalued in future occurrences.

At step 102, the controller 16 analyzes context data to determine whether a current state of the driver and/or vehicle 12 is a triggering state. More specifically, the controller 16 analysis context data via the context module 50 to determine whether a current state of the driver and/or vehicle 12 is a triggering state. If the controller 16 determines that a triggering state exists, the method 100 proceeds to step 104. If the controller 16 does not determine that a triggering state exists, the method 100 continues to process context data via the context module 50 until a triggering state exists.

In an embodiment, the triggering state includes a triggering driver state determined from driver data. In this embodiment, the controller 16 is programmed to trigger the audio device 24 to output at least a first audible sentence to the driver upon determining from the driver data that the current state is a triggering driver state. Specifically, the controller 16 is programmed to trigger the audio device 24 to output a plurality of audible sentences (e.g., steps 104, 108, 112) to the driver upon determining from the driver data that the current state is a triggering driver state. In an embodiment, the triggering driver state is a state in which the controller 16 determines that the driver is tired and/or distracted. In an embodiment, the controller 16 is configured to determine the triggering driver state based on at least one current image of the driver as determined from the driver sensor 30A. For example, in an embodiment, the controller 16 is programmed to trigger the audio device 24 to output the plurality of audible sentences upon determining that the current state is the triggering driver state based on the driver yawning. The driver yawning can be determined, for example, by an image taken by the driver sensor 30A which shows the driver's mouth to be opened by a predetermined amount and/or for a predetermined amount of time. In another embodiment, the controller 16 is programmed to trigger the audio device 24 to output the plurality of audible sentences upon determining that the current state is the triggering driver state based on the driver's eyes closing by a predetermined amount and/or for a predetermined period of time. The driver's eyes closing in this manner can indicate that the driver is falling asleep. In yet another embodiment, the controller 16 is programmed to trigger the audio device 24 to output the plurality of audible sentences upon determining that the current state is the triggering driver state based on the driver's line of sight being in a nonforward direction for a predetermined amount of time. The driver's line of sight being focused away from the road can indicate that the driver is not paying attention to the road.

In an embodiment, the triggering state includes a triggering traffic state determined from traffic data. In this embodiment, the controller 16 is programmed to trigger the audio device 24 to output at least a first audible sentence to the driver upon determining from the traffic data that the current state is a triggering traffic state. Specifically, the controller 16 is programmed to trigger the audio device 24 to output a plurality of audible sentences (e.g., steps 104, 108, 112) to the driver upon determining from the traffic data that the current state is a triggering traffic state. In an embodiment, the triggering traffic state is a state in which the controller 16 determines that potentially dangerous traffic conditions exist (e.g., traffic stoppages, road closures, etc.) which require the driver's attention.

In an embodiment, the triggering state includes a triggering weather state determined from weather data. In this embodiment, the controller 16 is programmed to trigger the audio device 24 to output at least a first audible sentence to the driver upon determining from the weather data that the current state is a triggering weather state. Specifically, the controller 16 is programmed to trigger the audio device 24 to output a plurality of audible sentences (e.g., steps 104, 108, 112) to the driver upon determining from the weather data that the current state is a triggering weather state. In an embodiment, the triggering weather state is a state in which the controller 16 determines that potentially dangerous weather conditions exist (e.g., heavy rain, snow, winds, etc.) which require the driver's attention.

In an embodiment, the triggering state includes a triggering road state determined from road data. In this embodiment, the controller 16 is programmed to trigger the audio device 24 to output at least a first audible sentence to the driver upon determining from the road data that the current state is a triggering road state. Specifically, the controller 16 is programmed to trigger the audio device 24 to output a plurality of audible sentences (e.g., steps 104, 108, 112) to the driver upon determining from the road data that the current state is a triggering road state. In an embodiment, the triggering road state is a state in which the controller 16 determines that potentially dangerous road conditions exist (e.g., unexpected road surface, sudden change in road surface, etc.) which require the driver's attention.

In an embodiment, the triggering state includes a triggering vehicle component state determined from vehicle component data. In this embodiment, the controller 16 is programmed to trigger the audio device 24 to output at least a first audible sentence to the driver upon determining from the vehicle component data that the current state is a triggering vehicle component state. Specifically, the controller 16 is programmed to trigger the audio device 24 to output a plurality of audible sentences (e.g., steps 104, 108, 112) to the driver upon determining from the vehicle component data that the current state is a triggering vehicle component state. In an embodiment, the triggering vehicle component state is a state in which the controller 16 determines that potentially dangerous vehicle component conditions exist (e.g., unexpected component usage, unexpected component failure, unexpected steering, unexpected loud noises detected, unexpected vibration detected, etc.) which require the driver's attention.

In an embodiment, the controller 16 determines a triggering state by determining the existence of at least two of a triggering driver state, a triggering traffic state, a triggering weather state, a triggering road state, and a triggering vehicle component state. In an embodiment, the controller 16 determines a triggering state by determining the existence of a triggering driver state in combination with at least one of a triggering traffic state, a triggering weather state, a triggering road state, and a triggering vehicle component state. In this way, the controller 16 ensures that the driver is paying attention when there is a heightened level of safety needed (e.g., due to traffic, weather, road conditions, and/or vehicle component failures). For example, in an embodiment, the controller 16 is programmed to trigger the audio device 24 to output the plurality of audible sentences upon determining (i) that the triggering driver state exists based on the driver data, and (ii) that a triggering weather state, triggering traffic state, triggering road state, or triggering vehicle component state exists based on received context data.

In an alternative embodiment, the controller 16 can periodically trigger step 104 without detection of a triggering state.

At step 104, the controller 16 causes the audio device 24 to output an audible sentence to the driver to initiate dialogue with the driver. In an embodiment, the audible sentence can be an initiating audible sentence. The audible sentence can also be considered a first audible sentence as discussed herein (e.g., with respect to step 108). Here, the initiating audible sentence is "Hi Jon, how are you doing?". This audible sentence is intended to initiate dialogue with the driver.

At step 106, the driver provides an audible response to the audio device 24. The audible response can be an initial audible response. The audible response can also be considered a first audible response as discussed herein (e.g., with respect to step 110). Here, the initial audible response is "Hi, I am <_________>." The controller 16 receives response data relating to the initial audible response provided by the driver to the audio device 24. The controller 16 then processes the response data. For example, in an embodiment, the controller 16 process an automatic speech recognition (ASR) output and/or a natural language understanding (NLU) output to determine what the driver said. In an embodiment, the controller 16 is further configured to identify key words in the audible response (e.g., the variable "<_________>" in the present example embodiment).

At step 108, the controller 16 causes the audio device 24 to output a first audible sentence to the driver. Here, the first audible sentence is "Let's talk about it a little, describe to me something that is on your mind." In an embodiment, the first audible sentence is a generic sentence. In another embodiment, the first audible sentence is a sentence from one of the plurality of dialogue trees 40 stored by the database 38. In an embodiment, the first audible sentence is one of a plurality of first audible sentences selected by the controller 16. In an embodiment, the first audible sentence is selected based on the response data processed at step 106. For example, in an embodiment, the controller 16 selects the first audible sentence based on one or more key word detected in the response data (e.g., the variable "<_________>" in the present example embodiment).

At step 110, the driver provides a first audible response to the audio device 24. The controller 16 receive response data relating to the first audible response provided by the driver to the audio device 24. Here, the first audible response is "I am thinking about <_________>." The controller 16 then processes the response data. Again, in an embodiment, the controller 16 process an automatic speech recognition (ASR) output and/or a natural language understanding (NLU) output to determine what the driver said. In an embodiment, the controller 16 is further configured to identify key words in the first audible response (e.g., the variable "<_________>" in the present example embodiment).

The controller 16 then selects a dialogue tree 40 of the plurality of dialogue trees 40 based on the response data. For example, in an embodiment, the controller 16 selects the dialogue tree 40 based on one or more key word detected in the response data (e.g., the variable "<_________>" in the present example embodiment). In an embodiment, the controller 16 selects the dialogue tree 40 based on at least one of: (i) one or more word detected in the first audible response, and/or (ii) a tone of the first audible response.

In an embodiment, each dialogue tree 40 is weighted. The controller 16 is programmed to select an appropriate dialogue tree 40 based on its weight. The weights can be based on the driver's preferences, how the driver has previously responded to one or more dialogue tree 40, one or more key word spoken by the driver in an audible response, and/or other factors. In an embodiment, the controller 16 is programmed to adjust a weight of the selected dialogue tree 40 in comparison to other of the plurality of dialog trees 40 in the memory 19 based on at least one second audible response provided by the driver to the audio device 24 in response to a second audible sentence from the selected dialogue tree 40. For example, if the driver reacts negatively to the first sentence of a selected dialogue tree 40 (e.g., with negative words or a negative tone), the controller 16 is programmed to reduce the weight applied to that dialogue tree 40 for future uses. Likewise, if the driver reacts positively to a selected dialogue tree 40 (e.g., with positive words or a positive tone), the controller 16 is programmed to increase the weight applied to that dialogue tree 40 for future uses.

At step 112, the controller 16 causes the audio device 24 to output a second audible sentence from the selected dialogue tree 40. Specifically, the controller 16 causes the audio device 24 to output a plurality of second audible sentences from the selected dialogue tree 40. Here, a second audible sentence is "That sounds like a <_________> related topic." The controller 16 then proceeds with additional second audible sentences from the selected dialogue tree 40.

In an embodiment, the controller 16 is programmed to adjust the selected dialogue tree 40 based on how the driver reacts to the second audible sentence. For example, if the driver reacts negatively to the first sentence of a selected dialogue tree 40 (e.g., with negative words or a negative tone), the controller 16 is programmed to choose a new dialogue tree 40 of the plurality of dialogue trees.

In an embodiment, the controller 16 performs sentiment analysis as response data is processed at steps 106 and/or 110 above. For example, in an embodiment, the controller 16 is programmed to determine the driver's sentiment based on driver data from the driver sensor 30A (e.g., the driver appearing angry in an image), by key words detected in the response data (e.g., negative words), and/or by the driver's voice inflection in the audible response received by the audio device 24 (e.g., a negative tone/inflection). As described herein, the controller 16 is programmed to adjust weights and/or change dialogue trees 40 based on the sentiment analysis.

In an embodiment, the controller 16 performs crisis detection as response data is processed at steps 106 and/or 110 above. For example, in an embodiment, the controller 16 is programmed to determine that a crisis exists if the driver does not respond to one or more audible sentences. In another example embodiment, the controller 16 is programmed to determine that a crisis exists if certain words present in the driver's response are indicative of a crisis (e.g., crisis words such as "help"). In another example embodiment, the controller 16 is programmed to determine that a crisis exists based on driver data from the driver sensor 30A (e.g., the driver appearing scared or upset in an image). In another example embodiment, the controller 16 is programmed to determine that a crisis exists based on the driver's voice inflection in the audible responses received by the audio device 24.

In an embodiment, the controller 16 is configured to adjust at least one vehicle component 20 during the method 100. In an embodiment, the controller 16 is programmed to adjust at least one vehicle component 20 when a crisis is detected. For example, in an embodiment, the controller 16 is programmed to adjust at least one vehicle component 20 when the driver does not respond to at least one of the plurality of audible sentences output by the audio device 24. More specifically, the controller 16 is programmed to adjust at least one vehicle component 20 when the driver does not respond to at least one of the first or second audible sentences output by the audio device 24. In an embodiment, the controller 16 is programmed to adjust at least one vehicle component 20 in response to certain words present in the driver's response, the driver's voice inflection in the audible response received by the audio device 24, and/or other driver data from the driver sensor 30A (e.g., the driver appearing scared in an image).

FIG. 3 illustrates an example embodiment of a dialogue tree 40. As illustrated, the dialogue tree 40 includes a plurality of audible sentences. The controller 16 is configured to cause the audio device 24 to output each of these audible sentences, for example, depending on the audible responses received from the driver of the vehicle 12. At step 41, the controller 16 causes the audio device 24 to output a first audible sentence of the dialogue tree 40 (e.g., "A popular technique in Cognitive Behavior is Glass Half Full thinking. Let's think about your problem together. Have you ever dealt with this issue or something similar before?"). At step 42, the controller 16 parses the response data (e.g., using an ASR/NLU output) from the first audible response, for example, for key words, sentiment analysis, and/or crisis detection. At step 43, the controller 16 causes the audio device 24 to output a second audible sentence of the dialogue tree 40 (e.g., "Can you think about some positives that can come out of this situation?"). At step 44, the controller 16 again parses the response data from the second audible response, for example, for key words, sentiment analysis, and/or crisis detection. Here, the controller 16 chooses the next audible sentence (e.g., at step 45 or step 46) based on the parsing at step 44. At step 45 (e.g., in response to a "Yes" answer at step 44), the controller 16 causes the audio device 24 to output a third audible sentence of the dialogue tree 40 (e.g., "Take a moment to name at least two positives. I will be listening."). At step 46 (e.g., in response to a "No" answer at step 44), the controller 16 causes the audio device 24 to output a fourth audible sentence of the dialogue tree 40 (e.g., "It helps to think about something funny perhaps in your situation.") At step 47, the controller 16 causes the audio device 24 to output a fifth audible sentence of the dialogue tree 40 (e.g., "Do tell me."). At step 48, the controller 16 again parses the response data from the third, fourth and/or fifth audible responses, for example, for key words, sentiment analysis, and/or crisis detection. At step 49, the controller 16 concludes the dialogue tree by causing the audio device 24 to output a sixth and final audible sentence of the dialogue tree 40 (e.g., "Thank you for sharing and chatting with me.").

Figure 4:
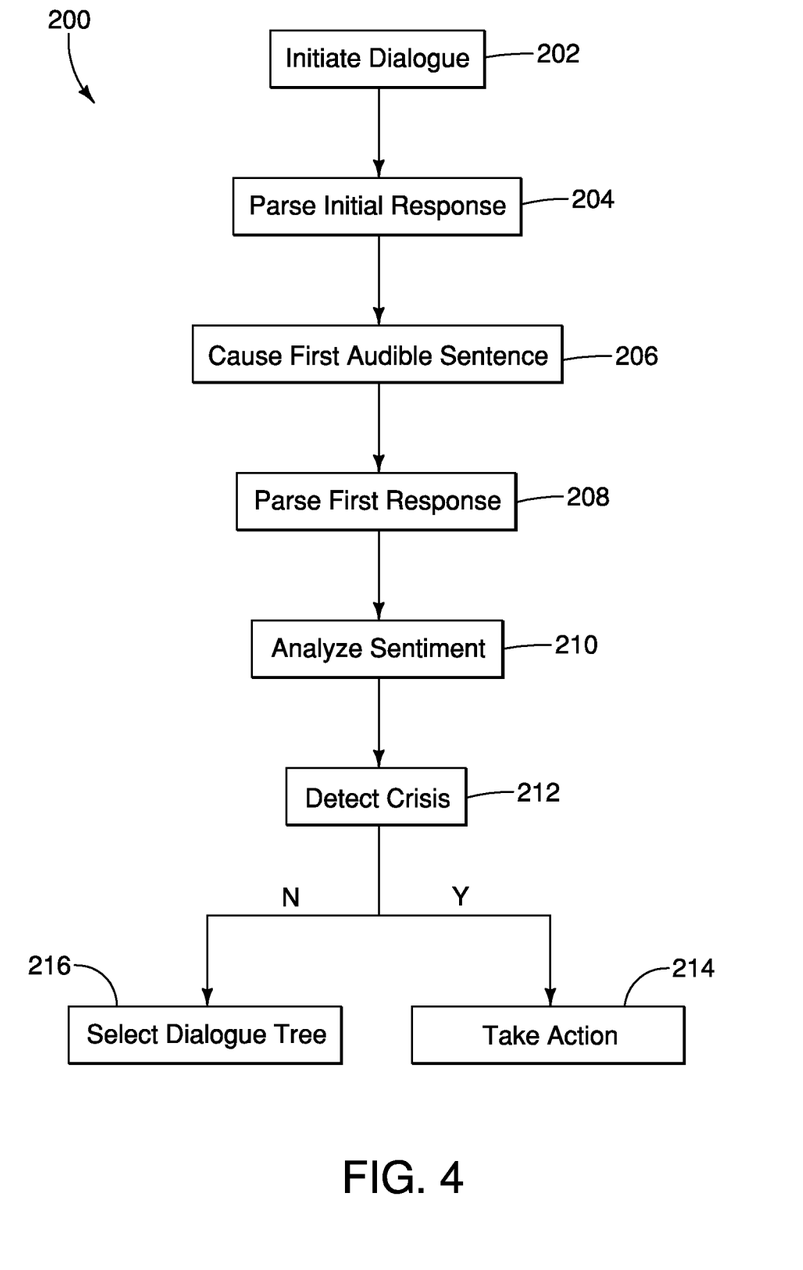
FIG. 4 illustrates another example embodiment of a method for testing driver awareness within a vehicle which can be implemented using the system of FIG. 1.

FIG. 4 illustrates another example embodiment of a method 200 for testing driver awareness within a vehicle 12. The method 200 can be performed in combination with and/or in place of certain steps of the method 100 discussed herein. Some or all of the steps of the method 200 can be stored as instructions on at least one memory 19 of the controller 16 and executed by at least one processor 18 of the controller 16. Some or all of the steps of the method 200 can also be stored as instructions on a memory of one or more of a vehicle component 20, audio device 24 and/or sensor 30 and executed by a processor of the vehicle component 20, audio device 24 and/or sensor 30. It should be understood from this disclosure that some of the steps described herein can be reordered or omitted without departing from the spirit or scope of the method 200.

At step 202, the controller 16 causes the audio device 24 to output an audible sentence to the driver to initiate dialogue with the driver. In an embodiment, the audible sentence can be an initiating audible sentence. The audible sentence can also be considered a first audible sentence as discussed herein (e.g., with respect to step 206). Step 202 can correspond to step 104 discussed above.

At step 204, the driver provides an audible response to the audio device 24. The audible response can be an initial audible response. The audible response can also be considered a first audible response as discussed herein (e.g., with respect to step 208). The controller 16 receives response data relating to the initial audible response provided by the driver to the audio device 24. The controller 16 then parses the response data. For example, in an embodiment, the controller processes an automatic speech recognition (ASR) output and/or a natural language understanding (NLU) output to determine what the driver said. In an embodiment, the controller 16 is further configured to identify key words in the audible response. Step 204 can correspond to step 106 discussed above.

At step 206, the controller 16 causes the audio device 24 to output a first audible sentence to the driver. In an embodiment, the first audible sentence is a generic sentence. In another embodiment, the first audible sentence is a sentence from one of the plurality of dialogue trees 40 stored by the database 38. In an embodiment, the first audible sentence is one of a plurality of first audible sentences selected by the controller 16. In an embodiment, the first audible sentence is selected based on the response data processed at step 204. For example, in an embodiment, the controller 16 selects the first audible sentence based on one or more word detected in the response data from the initial audible response. Step 206 can correspond to step 108 discussed above.

At step 208, the driver provides a first audible response to the audio device 24. The controller 16 receive response data relating to the first audible response provided by the driver to the audio device 24. The controller 16 then processes the response data. Again, in an embodiment, the controller 16 process an automatic speech recognition (ASR) output and/ or a natural language understanding (NLU) output to determine what the driver said. In an embodiment, the controller 16 is further configured to identify key words in the first audible response. Step 208 can correspond to step 110 discussed above.

At step 210, the controller 16 analyzes the driver's sentiment. As discussed above, the controller 16 is programmed to determine the driver's sentiment based on driver data from the driver sensor 30A (e.g., the driver appearing angry in an image), by key words detected in the response data (e.g., negative words), and/or by the driver's voice inflection in the audible response received by the audio device 24 (e.g., a negative tone/inflection).

At step 212, the controller 16 determines whether there is a crisis. As discussed above, in various embodiments, the controller 16 is programmed to determine that a crisis exists if the driver does not respond to one or more audible sentences, based on certain words present in the driver's response which are indicative of a crisis (e.g., crisis words such as "help"), based on driver data from the driver sensor 30A (e.g., the driver appearing scared or upset in an image), and/or based on the driver's voice inflection in the audible response received by the audio device 24. In an embodiment, the determination of the crisis can include the analysis of the driver's sentiment at step 110.

If the controller detects a crisis at step 212, the method 200 moves to step 214. At step 214, the controller 16 takes an action based on the crises. In an embodiment, the controller 16 is programmed to adjust at least one vehicle component 20 when a crisis is detected. The adjustment is intended to help with the crises and can be tailored to the crises that is detected. In one example, the vehicle component 20 includes the engine of the vehicle 12, and the controller 16 is configured to shut off the engine. In another example, the vehicle component 20 includes an emergency contact system within the vehicle, and the controller 16 is configured to cause the emergency contact system to contact an emergency service. In another example, the vehicle component 20 includes an in-vehicle alarm, and the controller 16 is configured to set off the alarm. In another embodiment, the vehicle component 20 includes a driver assistance system, and the controller 16 is configured to trigger the driver assistance system to safely pull the vehicle 12 off to the side of the road or to another safe location. Those of ordinary skill in the art will recognize from this disclosure that various other vehicle components 20 can be controlled in accordance with the systems and methods discussed herein.

If the controller 16 does not detect a crisis at step 212, the method 200 moves to step 216. At step 216, the controller 16 selects a dialogue tree 40 of the plurality of dialogue trees 40 as discussed herein. For example, in an embodiment, the controller 16 selects the dialogue tree 40 based on one or more key word detected in the response data. In an embodiment, the controller 16 selects the dialogue tree 40 based on at least one of: (i) one or more word detected in the first audible response, or (ii) atone of the first audible response. In an embodiment, the controller 16 selects a dialogue tree 40 at least in part based on the sentiment analysis performed at step 210 (e.g., different dialogue tree 40 are weighted more heavily for different types of sentiments). In an embodiment, the controller 16 selects a dialogue tree 40 based the weightings of the dialogue tree as discussed herein.

The controller 16 then causes the audio device 24 to output a plurality of second audible sentences from the selected dialogue tree 40. In an embodiment, the controller 16 is programmed to select a new dialogue tree 40 based on how the driver responds to the second audible sentences. In an embodiment, the controller 16 is programmed to adjust a weighting of the selected dialogue tree 40 based on how the driver responds to the second audible sentences.

The systems and methods described herein are advantageous for testing driver awareness within a vehicle 12, particularly when the driver appears sleepy or distracted or certain situations call for a heightened level of awareness. The systems and methods described herein further refocus the driver when it is determined that the driver is sleepy or distracted. It should be understood that various changes and modifications to the methods described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle 12 equipped as disclosed herein. Accordingly, these terms, as utilized to describe the present invention should be interpreted relative to a vehicle 12 equipped as shown herein.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired.

Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for testing driver awareness within a vehicle, the system comprising:
an audio device configured to output audible sentences to a driver of the vehicle and receive audible responses from the driver;
a memory storing a plurality of dialog trees, each dialogue tree triggering a plurality of audible sentences; and
a controller programmed to (i) cause the audio device to output a first audible sentence to the driver, (ii) receive response data relating to a first audible response provided by the driver to the audio device, (iii) select a dialogue tree of the plurality of dialogue trees based on the response data, (iv) cause the audio device to output a plurality of second audible sentences from the selected dialogue tree, and (v) adjust a weight of the selected dialogue tree in comparison to the plurality of dialog trees in the memory based on at least one second audible response provided by the driver to the audio device in response to a second audible sentence from the selected dialogue tree.

2. The system of claim 1, comprising
at least one sensor configured to generate driver data relating to a current state of the driver,
the controller programmed to cause the audio device to output the first audible sentence to the driver upon determining from the driver data that the current state is a triggering driver state.

3. The system of claim 1, wherein
the controller is programmed to cause the audio device to output the first audible sentence to the driver upon determining a triggering weather state based on received context data.

4. The system of claim 1, wherein
the controller is programmed to cause the audio device to output the first audible sentence to the driver upon determining a triggering traffic state based on received context data.

5. The system of claim 1, wherein
the controller is programmed to select the dialogue tree of the plurality of dialogue trees based on at least one of: (i) one or more word detected in the first audible response, or (ii) a tone of the first audible response.

6. The system of claim 1, wherein
the controller is programmed to adjust at least one vehicle component when the driver does not respond to at least one of the first or second audible sentences output by the audio device.

7. A system for testing driver awareness within a vehicle, the system comprising:
at least one sensor configured to generate driver data relating to a current state of a driver of the vehicle;
an audio device configured to output audible sentences to the driver and receive audible responses from the driver; and
a controller programmed to (i) trigger the audio device to output a plurality of audible sentences to the driver upon determining from the driver data that the current state is a triggering driver state, (ii) determine that the current state is a crisis state based on how the driver responds to the plurality of audible sentences, and (iii) automatically shut off an engine or contact an emergency service upon determining that the current state is the crisis state.

8. The system of claim 7, wherein
the at least one sensor includes a camera configured to record at least one image of the driver and generate the driver data from the at least one image.

9. The system of claim 7, wherein
the controller is programmed to trigger the audio device to output the plurality of audible sentences upon determining that the current state is the triggering driver state based on the driver yawning.

10. The system of claim 7, wherein
the controller is programmed to trigger the audio device to output the plurality of audible sentences upon determining that the current state is the triggering driver state based on the driver's eyes closing by a predetermined amount and/or for a predetermined period of time.

11. The system of claim 7, wherein
the controller is programmed to trigger the audio device to output the plurality of audible sentences upon determining that the current state is the triggering driver state based on the driver's line of sight being in a nonforward direction for a predetermined amount of time.

12. The system of claim 7, wherein
the controller is programmed to trigger the audio device to output the plurality of audible sentences upon determining (i) that the triggering driver state exists based on the driver data, and (ii) that a triggering weather state, a triggering traffic state, a triggering road state, or a triggering vehicle component state exists based on received context data.

13. The system of claim 7, wherein
the controller is programmed to adjust at least one vehicle component when the driver does not respond to at least one of the plurality of audible sentences output by the audio device.

14. The system of claim 7, wherein when the current state is the crisis state, the controller is programmed to automatically shut off the engine.

15. The system of claim 7, wherein when the current state is the crisis state, the controller is programmed to automatically contact the emergency service.

16. A method for testing driver awareness within a vehicle, the method comprising:
triggering an audio device to output a first audible sentence to a driver of the vehicle based upon a determination of at least one of a triggering driver state, a triggering weather state, a triggering traffic state, a triggering road state, or a triggering vehicle component state;
receiving response data relating to a first audible response provided by the driver to the audio device;
selecting a dialogue tree from a plurality of dialogue trees based on the response data; and
causing the audio device to output a plurality of second audible sentences from the selected dialogue tree; and
adjusting a weight of the selected dialogue tree in comparison to the plurality of dialog trees based on at least one second audible response provided by the driver to the audio device in response to a second audible sentence from the selected dialogue tree.

17. The system of claim 16, comprising
triggering the audio device to output the first audible sentence to the driver based upon a determination of at least two of the triggering driver state, the triggering weather state, the triggering traffic state, the triggering road state, and the triggering vehicle component state.

18. The system of claim 16, comprising
    determining the triggering driver state based on at least one current image of the driver.

19. The system of claim 16, comprising selecting the dialogue tree from the plurality of dialogue trees based on at least one of:
    (i) one or more word detected in the first audible response, or (ii) a tone of the first audible response.

20. The system of claim 16, comprising
    adjusting at least one vehicle component when the driver does not respond to at least one of the first or second audible sentences output by the audio device.

\* \* \* \* \*